United States Patent [19]
Holmes

[11] Patent Number: 5,456,536
[45] Date of Patent: Oct. 10, 1995

[54] INEXPENSIVE, LIGHT-WEIGHT BEARING

[76] Inventor: Richard W. Holmes, 1375 Santa Monica Rd., Carpinteria, Calif. 93013

[21] Appl. No.: 122,768

[22] Filed: Sep. 16, 1993

[51] Int. Cl.⁶ ............................ F16C 17/04; F16C 33/02
[52] U.S. Cl. .......................... 384/420; 384/129; 384/295
[58] Field of Search ...................................... 384/129, 275, 384/276, 295, 296, 297, 298, 299, 300, 416, 420

[56] References Cited

U.S. PATENT DOCUMENTS

| | | | |
|---|---|---|---|
| 3,120,982 | 2/1964 | Leblanc | 384/420 |
| 3,725,973 | 4/1973 | Gwozdz | 384/420 X |
| 4,239,301 | 12/1980 | Pannwitz | 384/125 |
| 4,969,752 | 11/1990 | Kubota et al. | 384/420 |
| 5,192,137 | 3/1993 | Renard | 384/275 |

OTHER PUBLICATIONS

Copy of page from WoodCraft Mail Order Catalog no date.
Copy of 2 pages of Spec. Sheet for Nylatron™ no date.

*Primary Examiner*—Thomas R. Hannon
*Attorney, Agent, or Firm*—John A. Frazzini

[57] ABSTRACT

A bearing having an inner section that is easily snapped into an outer section to form the bearing. The inner section includes a cylindrical ring portion and an exterior-extending, locking ring portion. The outer section includes a cylindrical ring portion and an interior-extending, locking ring portion. When formed of self-lubricating plastic, this bearing is light-weight, thin and inexpensive. Dimensions can be selected to make this bearing easy or difficult to disassemble.

11 Claims, 6 Drawing Sheets

INEXPENSIVE, LIGHT-WEIGHT BEARING

BACKGROUND OF THE INVENTION

FIELD OF THE INVENTION

This invention relates in general to bearings and relates more particularly to bearings that are inexpensive and light-weight.

CONVENTION REGARDING REFERENCE NUMERALS

In the figures, each element indicated by a reference numeral will be indicated by the same reference numeral in every figure in which that element appears. The first digit of any reference numeral indicates the first figure in which its associated element is presented.

DESCRIPTION OF THE PRIOR ART

FIG. 1 illustrates a typical kaleidoscope 10 in which an eyepiece 11 is attached to a first cylindrical section 12 that is held by the user such that this eyepiece is located directly in front of this user's eye. A second cylindrical section 13 is rotatably attached by a bearing 14 to the first cylindrical section. As this second portion is rotated, the pattern produced within the kaleidoscope varies through an unending variety of colored patterns.

In very inexpensive kaleidoscopes, the first and second cylindrical sections are each made of cardboard and the second cylindrical section 13 has an inner diameter that is marginally larger than the first cylindrical section 12, so that the interface between the inner surface of the second cylindrical section 13 and the outer surface of the first cylindrical section 12 function as a bearing surface. This bearing is typically unlubricated and the first so that there is significant friction and wear between these two cylinders. This is generally acceptable in such inexpensive kaleidoscopes.

In a higher quality kaleidoscope, it would be desirable to have a bearing that enables the two cylindrical sections to be rotated more easily and with less wear. However, it is still desirable to keep the cost very low while improving the functionality of the bearing that couples these two sections together. In order to avoid interfering with the kaleidoscopic action, it is important that this bearing have a relatively larger central opening through which light can pass from the first cylindrical section of the kaleidoscope to its second cylindrical section.

FIGS. 2A and 2B illustrate a prior art ball bearing 20 having a relatively large central opening. This ball bearing has a wide variety of applications. For example, it can be used in a lazy susan to enable a top platform to rotate about a pedestal portion of this device, can be used in a chair to enable the seat to rotate about a base portion of this chair and can also be used in kaleidoscopes. As illustrated in the side view presented in FIG. 2B, this ball bearing includes a mount 21 that is typically attached to a stationary part of a device, a journal that is attached to a rotatable part of a device, a race (not shown) within which a plurality of ball bearings 23 roll easily, thereby enabling the journal to be rotated easily relative to the mount. FIG. 2A is a top view of this ball bearing illustrating that the journal is attached to the race by means of a central portion of the mount is bent up, through a central hole 24 in this ball bearing and outward until it forms a clamping ring 25 that attaches the journal to the mount such that the ball bearings are held in contact with both the mount and the journal. Unfortunately, this type of bearing is more complicated and expensive than is desired for use in higher quality kaleidoscopes. Therefore, it would be advantageous to have available a self-lubricating, light-weight bearing that would be suitable for use in kaleidoscopes and other low-cost devices in which a light-weight bearing would be advantageous.

SUMMARY OF THE INVENTION

This invention relates in general to bearings and relates more particularly to an inexpensive, lightweight bearing that is particularly useful in applications in which cost and/or weight is an important factor. This bearing also has the advantage of having a relatively large, central opening, thereby making this bearing attractive for use in kaleidoscopes. In addition, it can be made of a self-lubricating plastic, so that it provides the advantage of being self-lubricating. In addition, it is very easily and quickly assembled, so that it provides cost advantages in terms of both materials and assembly time costs.

This bearing consists of a pair of mating pieces whose lateral dimensions can be selected, so that its mating pieces are easily assembled together and can be disassembled without destruction of or damage to this bearing. However, an advantage of this design is that the lateral dimensions of these two mating pieces can alternatively be selected so that it can still be easily and quickly assembled, but can be disassembled only with such difficulty that it is likely that one of the mating pieces must be broken to separate these two mating pieces.

The mating pieces are preferably of plastic, because this results in a bearing that is relatively inexpensive, that is relatively light weight, that is impervious to most types of corrosion and that is easily manufactured by injection molding. Preferably, a self-lubricating plastic is used so that this bearing provides a low resistance to relative rotation between the two mating parts. However, other materials can also be used when strength or some other physical factor is a key factor that is not met by use of a self-lubricating plastic.

This bearing provides the advantages of: being light weight, when made out of a plastic material; being relatively thin; having flat mounting surfaces that enable it to be attached by epoxy glue; being easy and inexpensive to assemble; and, for particular choices of dimensions, being easy to disassemble without damage. In addition, the large opening through the middle of the bearing and the other advantages makes this bearing an ideal choice for use in attaching the two halves of a kaleidoscope.

DESCRIPTION OF THE PREFERRED EMBODIMENTS

Figure 1:
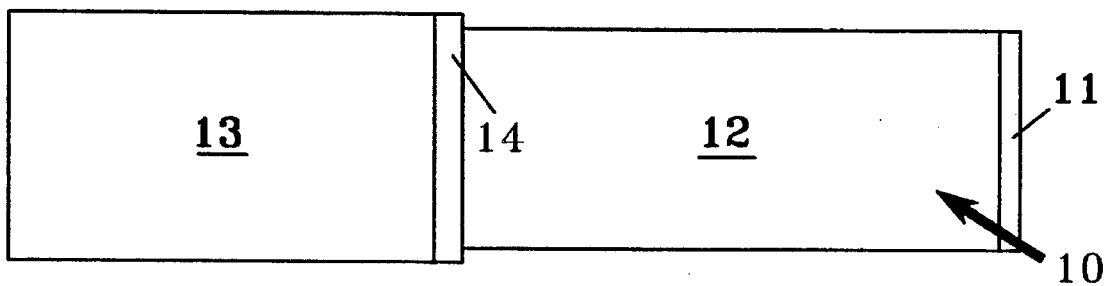
FIG. 1 illustrates a typical kaleidoscope in which an eyepiece is attached to a first cylindrical section that is held by the user such that this eyepiece is located directly in front of this user's eye.
Figure 2A:
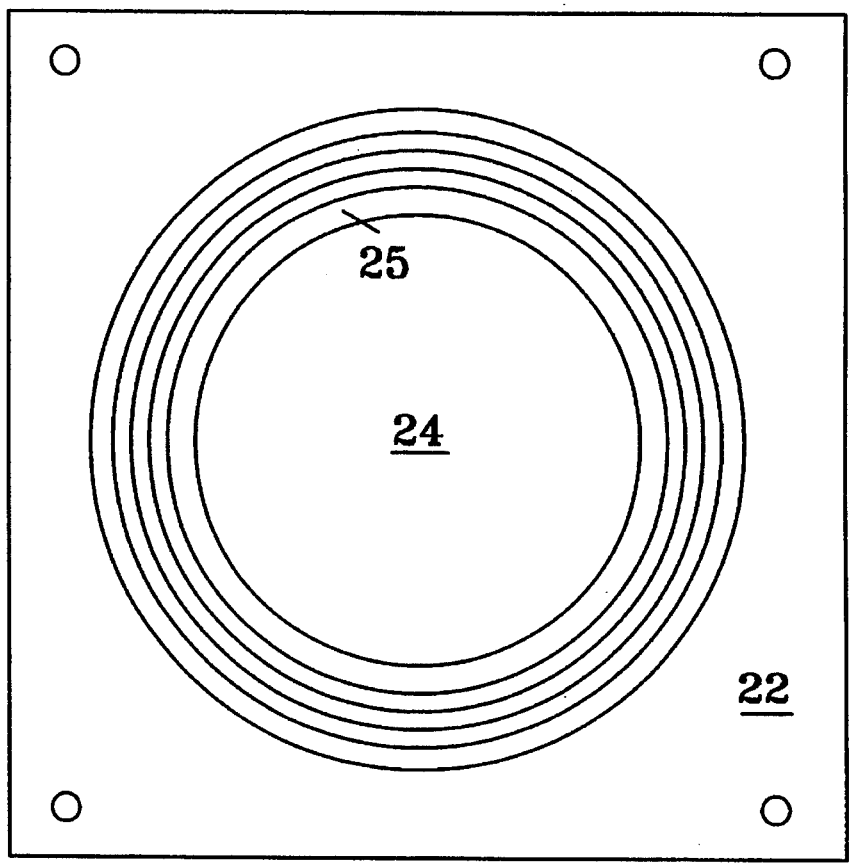
FIGS. 2A and 2B are, respectively, top and side views of a prior art ball bearing having a relatively large central opening.
Figure 2B:
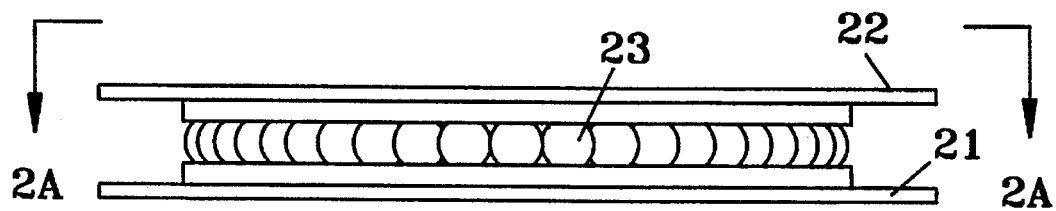
Figure 3A:
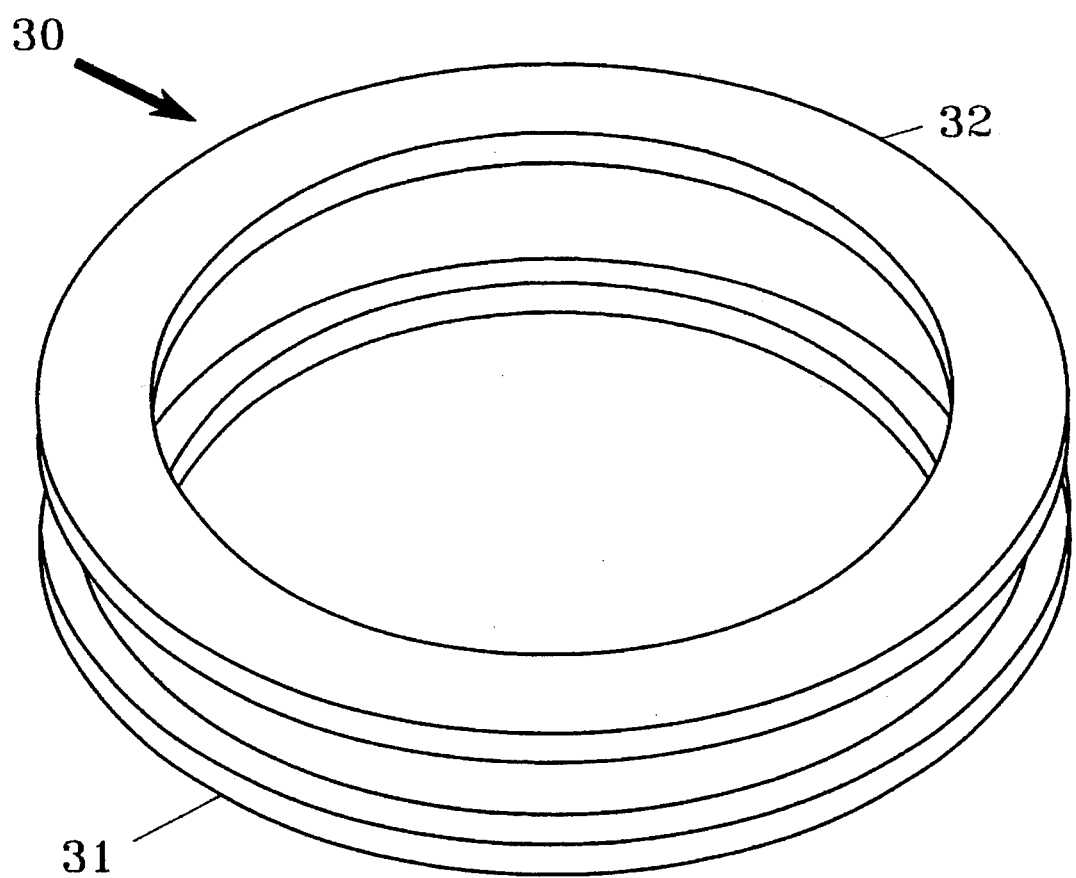
FIG. 3A is a perspective view of a low-cost bearing, that includes an outer section and an inner section.
Figure 3B:
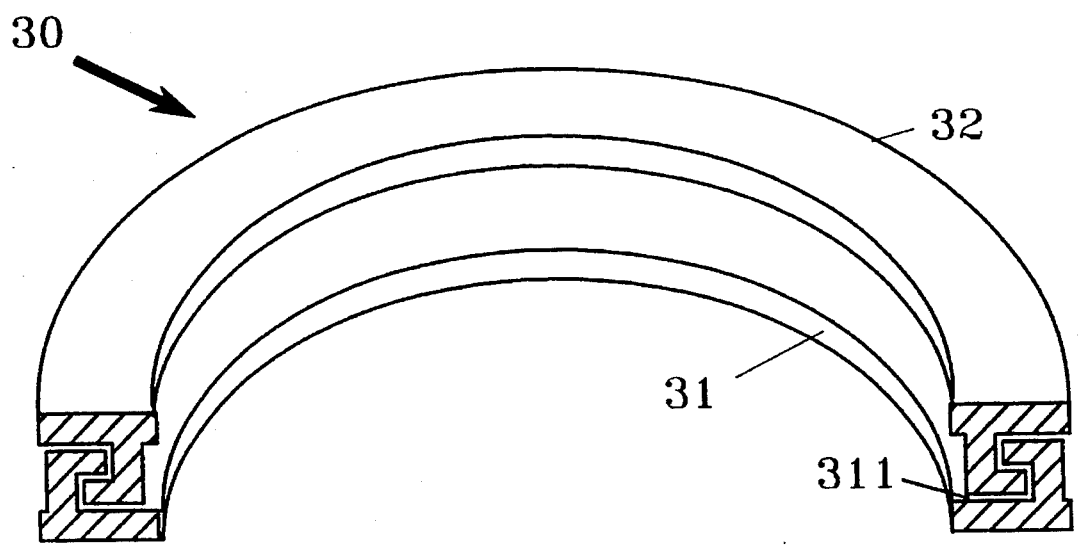
FIG. 3B is a cross-sectional view of the bearing illustrated in FIG. 3A.

FIG. 3A is a perspective view of a low-cost bearing 30, that includes an outer section 31 and an inner section 32. FIG. 3B is a cross-sectional view of the bearing illustrated in FIG. 3A, showing how the outer and inner sections interlock.

Figure 3C:
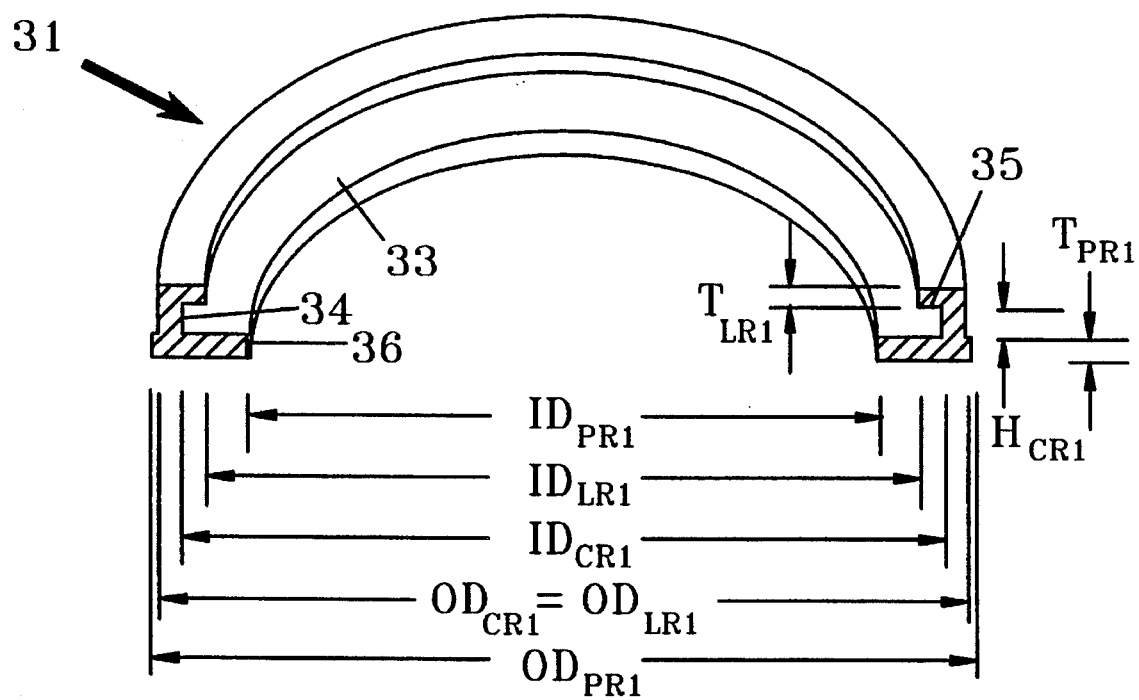
FIG. 3C is a cross-sectional view of the outer section of the low-cost bearing illustrated in FIGS. 3A and 3B.

FIG. 3C is a cross-sectional view of the outer section 31 of the low-cost bearing illustrated in FIGS. 3A and 3B. This outer section is adapted to mate with the inner section 32 illustrated in FIG. 3B. This outer section 31 includes a first planar ring portion 33, a first cylindrical ring portion 34 and an interior-extending, locking ring portion 35.

First planar ring portion 33 has a 0.100 cm thickness $T_{PR1}$, a 3.000 cm inner diameter $ID_{PR1}$ and a 4.000 cm outer diameter $OD_{PR1}$. This first planar ring portion provides most of the structural strength of the outer section and provides a first planar attachment surface 36 that is typically attached to a first of two elements that are to be rotatably connected by this bearing. The first cylindrical ring portion 34 has a 0.050 cm height $H_{CR1}$, a 3.500 cm inner diameter $ID_{CR1}$ and a 3.750 cm outer diameter $OD_{CR1}$. The first interior-extending, locking ring portion 35 has a 0.050 cm thickness $T_{LR1}$, a 3.425 cm inner diameter $ID_{LR1}$ and a 3.750 cm outer diameter $OD_{LR1}$.

Figure 3D:
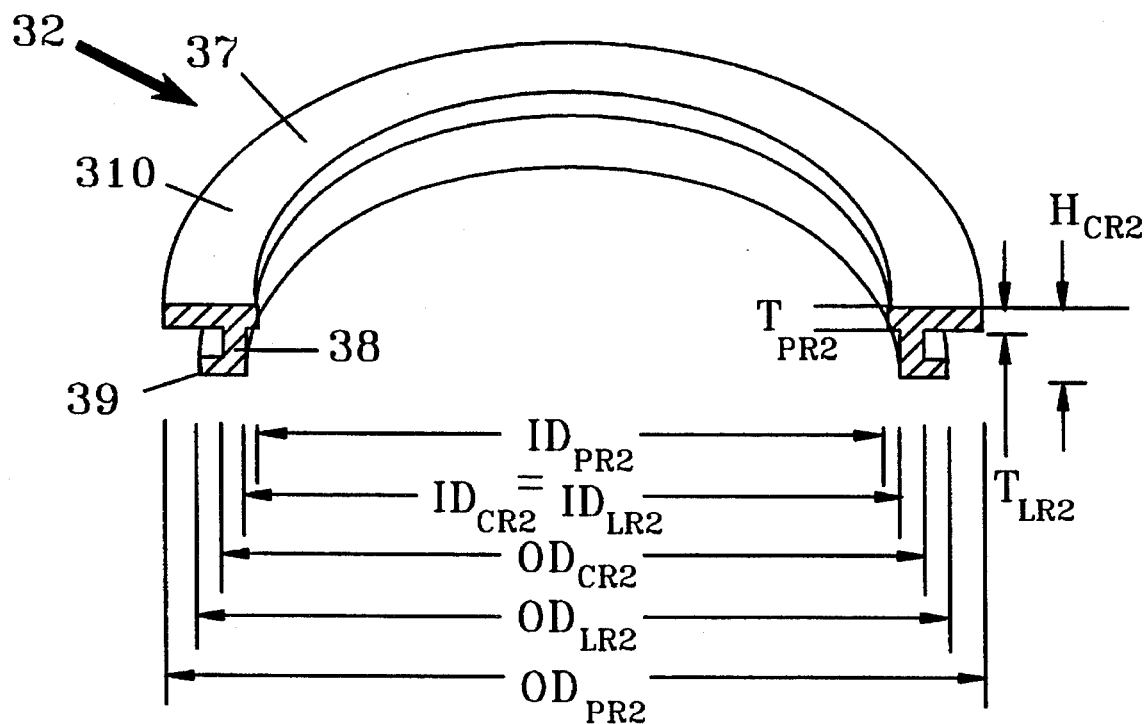
FIG. 3D is a cross-sectional view of the inner section of the low-cost bearing illustrated in FIGS. 3A–3B.

FIG. 3D is a cross-sectional view of the inner section 32 of the low-cost bearing illustrated in FIGS. 3A–3B. This inner section 32 includes a second planar ring portion 37, a second cylindrical ring portion 38 and an exterior-extending locking ring portion 39.

Second planar ring portion 37 has a 0.100 cm thickness $T_{PR2}$, a 3.000 cm inner diameter $ID_{PR2}$ and a 4.000 cm outer diameter $OD_{PR2}$. This second planar ring portion provides most of the structural strength of the inner section and provides a second planar attachment surface 310 that is typically attached to a second of two elements that are to be rotatably connected by this bearing. The second cylindrical ring portion 38 has a 0.060 cm height $H_{CR2}$, a 3.250 cm inner diameter $ID_{CR2}$ and a 3.400 cm outer diameter $OD_{CR2}$. The exterior-extending, locking ring portion 39 has a 0.040 cm thickness $T_{LR2}$, a 3.250 cm inner diameter $ID_{LR2}$ and a 3.490 cm outer diameter $OD_{LR2}$.

These dimensions are such that there is a 0.010 cm gap 311 between the 3.500 cm inner diameter $ID_{CR1}$ of the first cylindrical ring portion 34 and the outer diameter of the 3.490 cm outer diameter $OD_{LR2}$ of the exterior-extending, locking ring portion 39. This enables these rings to interlock without producing significant friction at the interface between the outer edge of the exterior-extending locking ring portion 39 and the inner surface of the first cylindrical ring portion 34. Similar gaps also prevent significant friction between other mating surfaces.

Figure 4A:
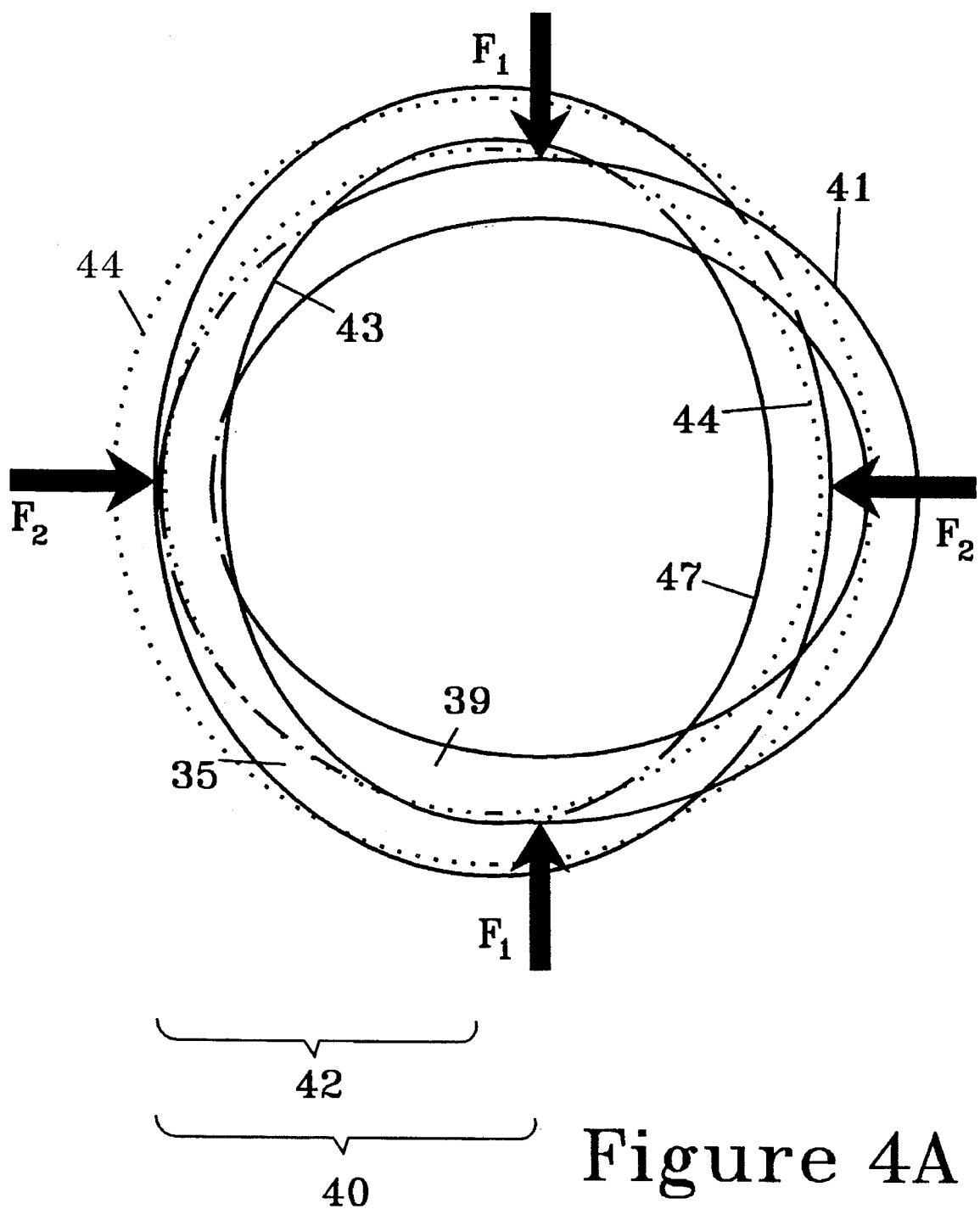
FIG. 4A illustrates a first stage of pressing the inner section of the bearing into the outer section of this bearing.
Figure 4B:
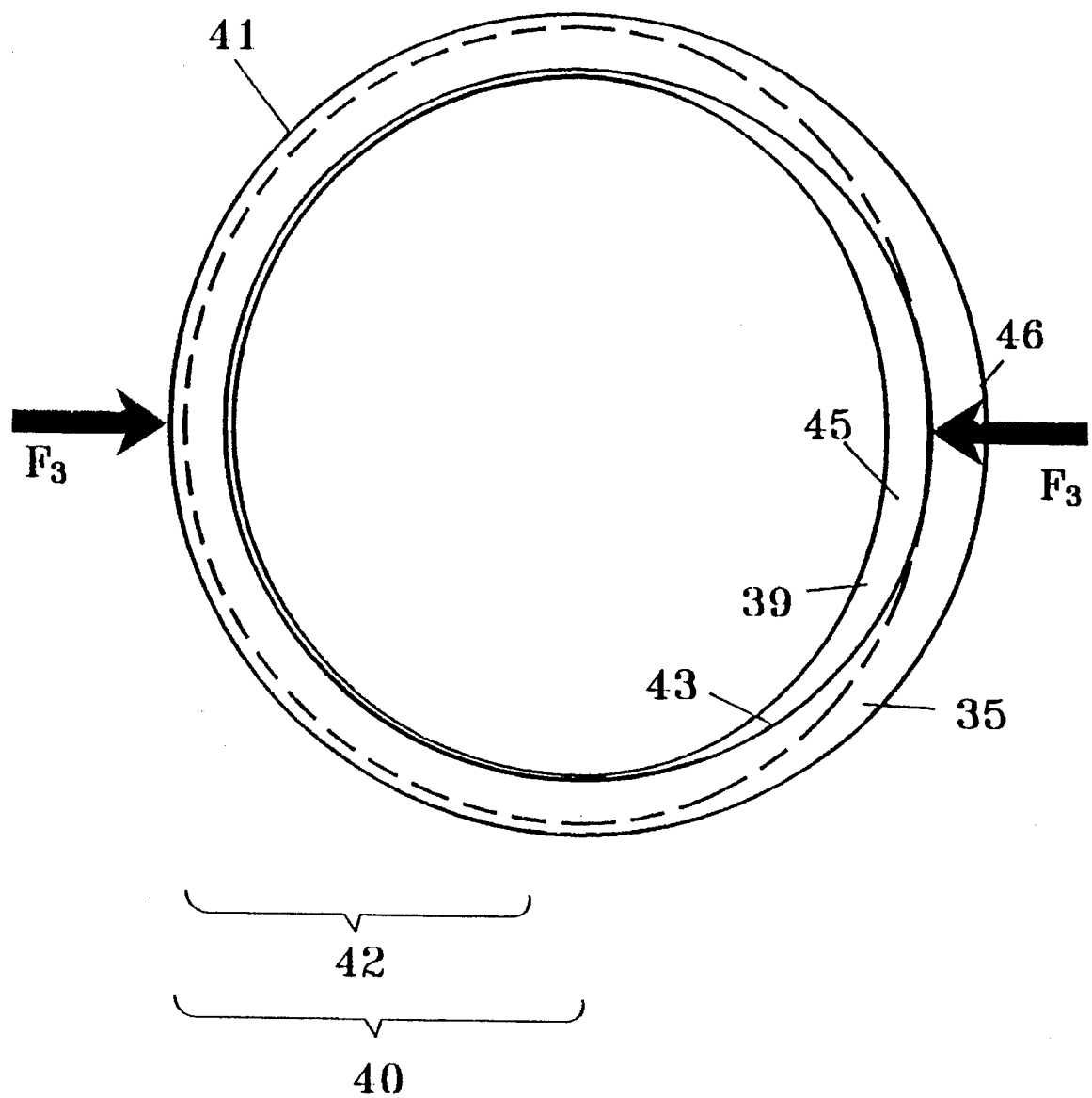
FIG. 4B illustrates a second stage of pressing the inner section of the bearing into the outer section of this bearing.
Figure 5A:
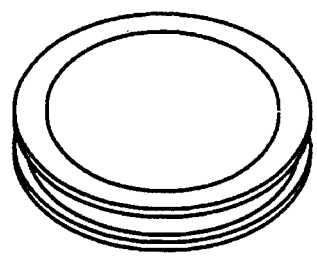
FIGS. 5A–5D are analogous to FIGS. 3A–3D, except that the dimensions have been selected such that this embodiment cannot be disassembled, after assembly, without significant risk of damaging the bearing.
Figure 5B:
Figure 5C:
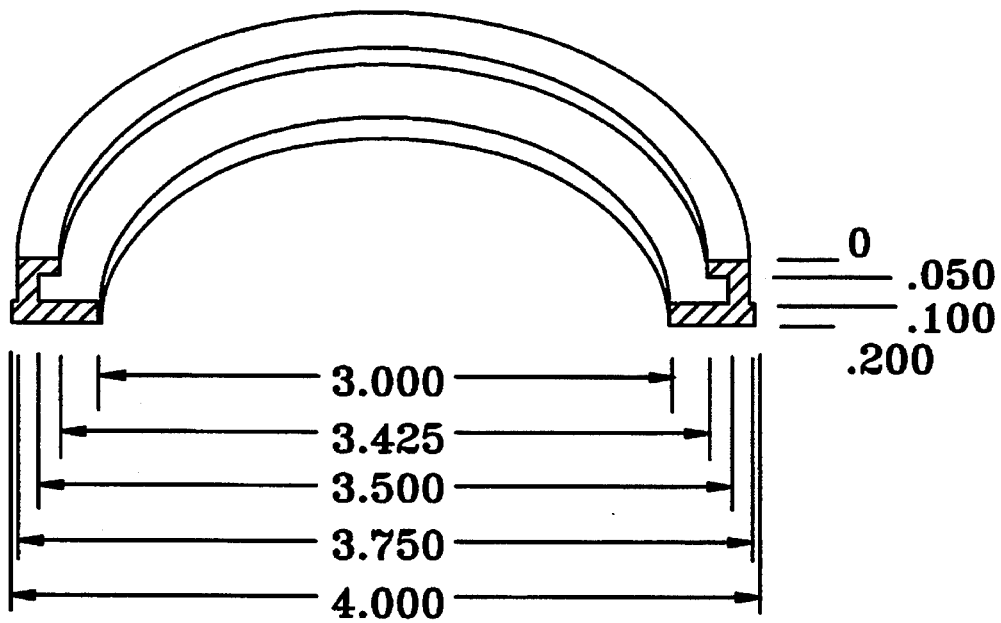
Figure 5D:
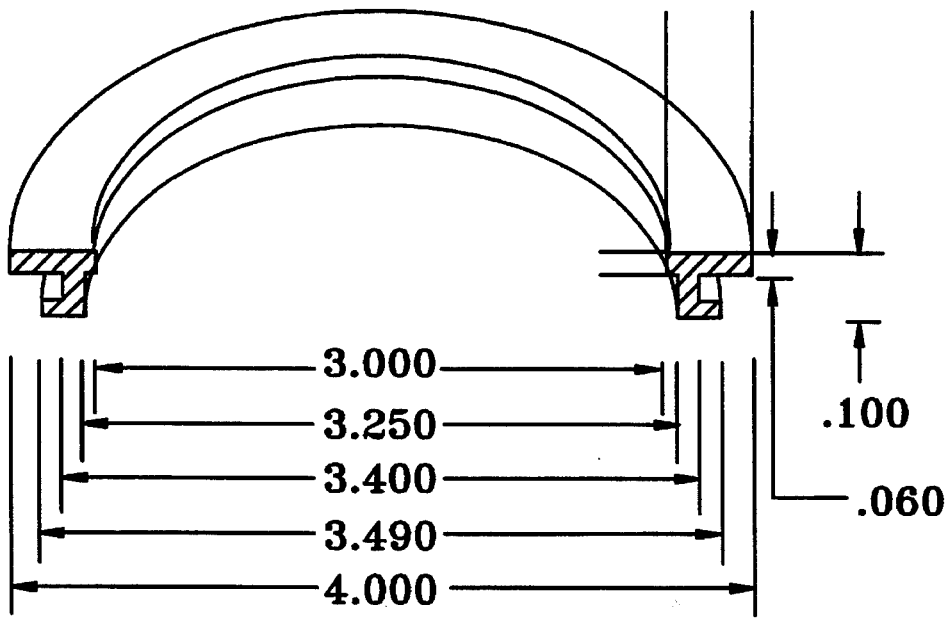

However, it should be noted that the 3.490 cm outer diameter $OD_{LR2}$ of the exterior-extending locking ring portion 39 of the inner section 32 of bearing 30 is 0.065 cm larger than the 3.425 cm inner diameter $ID_{LR1}$ of the interior-extending locking ring portion 35 of the outer section 31. Therefore, as illustrated in FIGS. 4A and 4B, in order to snap these inner and outer sections of this bearing together, one or, preferably, both of these two sections must be deformed from a circular cross-section into an elliptical cross-section such that a front half 40 of an elliptically-deformed, outer edge 41 of exterior-extending, locking ring portion 39 (dashed lines) fits into a front half 42 of an elliptically-deformed, inner edge 43 of interior-extending, locking ring portion 35. The circular (dotted line) edges 44 of an undeformed, exterior-extending, locking ring 39 are provided for reference purposes to see the effects of the deformations of exterior-extending locking ring portion 39 and interior-extending locking ring portion 35 during these steps of assembly.

In FIG. 4A, exterior-extending locking ring portion 39 is squeezed laterally (indicated by forces $F_1$ applied to inner section 32) to deform it into an ellipse and interior-extending locking ring portion 35 is squeezed longitudinally (indicated by forces $F_2$ applied to outer section 31) to enable front half 40 exterior-extending locking ring portion 39 to be inserted within and under a front half 42 of interior-extending, locking ring portion 35. During this step, inner section 32 is deformed to narrow its lateral dimension and outer section 31 is deformed to widen its lateral dimension so that the exterior-extending, locking ring portion 39 fits into the central opening of the interior-extending, locking ring portion 35.

As illustrated in FIG. 4B, while maintaining a force $F_3$ of these rings toward one another along their cylindrical axes and in a direction pressing the front half 40 of the inner section into the front half 42 of the outer section, a rear end 45 of the ring portion 39 is pressed forward within the rear end 46 ring portion 35, thereby deforming ring portion 39 from an ellipse 43 that is elongated along a longitudinal direction of insertion of the inner section into the outer section to an ellipse 44 that is elongated along that direction which is perpendicular to the direction of insertion and is also perpendicular to the plane of these inner and outer sections. When the deforming forces are released, ring portions 35 and 39 both return to circular cross-sections with ring portion 39 locked under ring portion 35.

Although the steps of snapping outer and inner sections of the bearing together can be reversed to decouple these two sections, if the dimensions are chosen such that it is barely possible to snap these two sections together, then it is almost impossible to later separate these two sections without breaking at least one of them. FIGS. 5A–5D are analogous to FIGS. 3A–3D, except that the dimensions have been selected such that this embodiment cannot be disassembled, after assembly, without significant risk of damaging at least one of its two sections. By "significant risk" is meant that on the order of 5% or more are damaged if they are attempted to be disassembled without use of particularly adapted machinery or an unusual degree of care by a typical buyer. This embodiment is therefore useful in applications where it is more important to ensure that these two sections do not inadvertently decouple than to enable the bearing to be disassembled after assembly.

These two sections of the bearing can be fabricated out of a number of materials such as various plastics and flexible metals. It is only necessary that the material have "memory", which means that each section will resume its original shape after being deformed during assembly of the two sections of the bearing. For material cost and manufacturing cost reasons, it is preferred that both portions be made of plastic, because this enables easy fabrication of inexpensive parts by conventional fabrication processes, such as injection molding. It is preferred that the plastic be "self-lubricating", which means That the mating faces of the interlocking sections exhibit a coefficient of friction on the order of or less than 0.3. Two examples of such material are Delrin™ and Nylon™.

I claim:

1. A bearing comprising: an outer section having:

a first cylindrical ring portion;

an interior-extending, locking ring portion attached to said first cylindrical ring portion and extending inward of an inner surface of said first cylindrical ring portion; and an outer section, ring portion which, in combination with said first cylindrical ring portion and said interior-extending locking ring portion produce a radially-outward-facing recess adapted for coupling with an inward-extending portion of said inner section;

an inner section having:

a second cylindrical ring portion;

an exterior-extending, locking ring portion attached to said second cylindrical ring portion and extending outward of an outer surface of said second cylindrical ring portion; and an inner section ring portion which, in combination with said second cylindrical ring portion and said inward-extending locking ring portion produce a radially-inward-facing recess adapted for coupling with said inner section such that, when the inner and outer sections are coupled together, said interior-extending locking ring portion of said outer section extends into said outward-facing recess and said exterior-extending locking ring portion of said inner section extends into said inward-facing recess.

2. A bearing as in claim 1 wherein said inner section ring portion is a first planar ring portion, wherein said first cylindrical ring portion is attached between said inner section ring portion and said interior-extending, locking ring portion.

3. A bearing as in claim 2 wherein said first planar ring portion has a first planar surface suitable for attaching this bearing to other elements.

4. A bearing as in claim 3 wherein said interior-extending, locking ring portion is attached, via said first cylindrical ring portion, to said first planar ring portion such that said interior-extending, locking ring portion and said first cylindrical ring portion are recessed away from said first planar surface such that an adhesive can readily be applied to said first planar surface without coating either said interior-extending, locking ring portion or said first cylindrical ring portion.

5. A bearing as in claim 2, wherein said outer ring portion is a second planar ring portion, wherein said second cylindrical ring portion is attached between said outer section ring portion and said exterior-extending, locking ring portion.

6. A bearing as in claim 5 wherein said second planar ring portion has a second planar surface suitable for attaching this bearing to other elements.

7. A bearing as in claim 6 wherein said exterior-extending, locking ring portion is attached, via said second cylindrical ring portion, to said second planar ring portion such that said exterior-extending, locking ring portion and said second cylindrical ring portion are recessed away from said second planar surface such that an adhesive can readily be applied to said second planar surface without coating either said exterior-extending, locking ring portion or said second cylindrical ring portion.

8. A bearing as in claim 1 wherein said outer and inner sections are made of plastic.

9. A bearing as in claim 8 wherein said plastic is self-lubricating.

10. A bearing as in claim 1 wherein the dimensions of the elements of this bearing are such that it can be disassembled without a significant risk of damage.

11. A bearing as in claim 1 wherein the dimensions of the elements of this bearing are such that it cannot be disassembled without a significant risk of damage.

* * * * *